(12) United States Patent
Li et al.

(10) Patent No.: US 11,384,798 B2
(45) Date of Patent: Jul. 12, 2022

(54) ANGLE-ADJUSTABLE TRIPOD UNIVERSAL JOINT

(71) Applicant: Shanghai GKN Huayu Driveline Systems Company Limited, Shanghai (CN)

(72) Inventors: Xiaotian Li, Shanghai (CN); Tangjun Peng, Shanghai (CN); Delin Wang, Shanghai (CN); Zhenghua Zhang, Shanghai (CN); Lu Jin, Shanghai (CN)

(73) Assignee: Shanghai GKN Huayu Driveline Systems Company Limited, Shanghai (CN)

( * ) Notice: Subject to any disclaimer, the term of this patent is extended or adjusted under 35 U.S.C. 154(b) by 293 days.

(21) Appl. No.: 16/473,250

(22) PCT Filed: Mar. 3, 2017

(86) PCT No.: PCT/CN2017/075571
§ 371 (c)(1),
(2) Date: Jun. 25, 2019

(87) PCT Pub. No.: WO2018/120412
PCT Pub. Date: Jul. 5, 2018

(65) Prior Publication Data
US 2019/0323650 A1    Oct. 24, 2019

(30) Foreign Application Priority Data

Dec. 26, 2016 (CN) .......................... 201611217170.0

(51) Int. Cl.
*F16D 3/202* (2006.01)

(52) U.S. Cl.
CPC ...... *F16D 3/202* (2013.01); *F16D 2003/2023* (2013.01); *Y10S 464/905* (2013.01)

(58) Field of Classification Search
CPC ............. F16D 3/202; F16D 2003/2023; F16D 2003/2026; F16D 3/2055; F16D 3/26;
(Continued)

(56) References Cited

U.S. PATENT DOCUMENTS 4,167,860 A * 9/1979 Sakaguchi ............. F16D 3/202
                                                        464/111
4,810,232 A * 3/1989 Farrell .................. F16D 3/2055
                                                        464/111
(Continued)

FOREIGN PATENT DOCUMENTS

FR        2 600 730 A1 * 12/1987 ..................... 464/111

*Primary Examiner* — Greg Binda

(57) ABSTRACT

An angle-adjustable tripod universal joint which has one tripod, three rollers and one universal joint outer part. An inner wall of the universal joint outer part has three roller tracks, and one roller is disposed in each of the roller tracks and rolls along the roller track. The inner cavity of each roller has a rotatably disposed spherical shaft head of the tripod. The inner wall of each roller track has a guiding groove. The peripheral shape of each roller is cylindrical. The bottom surface of the guiding groove is a plane surface, and two side surfaces of the guiding groove are flat surfaces perpendicular to the plane surface. The peripheral surface of each roller is partially inserted into the corresponding guiding groove, and the peripheral surface of the roller is tangent to the corresponding plane surface.

4 Claims, 3 Drawing Sheets

(58) Field of Classification Search
CPC .. Y10S 464/905; F16M 11/16; F16M 11/242; F16M 11/2078
USPC .......................................... 464/111, 123, 132
See application file for complete search history.

(56) References Cited

U.S. PATENT DOCUMENTS

| | | |
|---|---|---|
| 5,935,009 A | 8/1999 | Hosdez et al. |
| 6,431,986 B2 * | 8/2002 | Olszewski ............ F16D 3/2055 464/111 |
| 7,753,799 B2 * | 7/2010 | Francois ............... F16D 3/2055 464/111 |

* cited by examiner

ANGLE-ADJUSTABLE TRIPOD UNIVERSAL JOINT

CROSS REFERENCE TO RELATED APPLICATION

This is a Sect. 371 National Stage application of a PCT international Application No. PCT/CN2017/075571, filed on Mar. 3, 2017, which claims priority of a Chinese Patent Application No. 2016112171700, filed on Dec. 26, 2016 the contents of both applications are hereby incorporated by reference in their entireties for all purposes.

BACKGROUND OF THE PRESENT DISCLOSURE

Field of Disclosure

The present disclosure relates to the technical field of universal joints, in particular to an angle-adjustable tripod universal joint.

Description of Related Arts

When a tripod universal joint is in operation, relative movement and frictional force exist between a roller rotating around a tripod shaft head and a roller track of a universal joint outer part, thereby generating slip resistance and axial derived force which are against the smooth operation of the universal joint. The greater frictional force between the roller and roller track will result in greater the slip resistance and greater axial derived force of the universal joint.

SUMMARY OF THE PRESENT DISCLOSURE

An object of the present disclosure is to provide an angle-adjustable tripod universal joint, which is used to solve the problem of large slip resistance and axial derived force of the tripod universal joint.

The present disclosure provides an angle-adjustable tripod universal joint. The tripod universal joint comprises a tripod with three spherical shaft heads, three rollers deposited on each shaft heads and a universal joint outer part, wherein an inner wall of the universal joint outer part is provided with three roller tracks, the three rollers is disposed in the three roller tracks and rolls along the roller tracks, three spherical shaft heads on the tripod are rotatably disposed in an inner cavity of each roller, the inner wall of the roller track is provided with a guiding groove, the roller has a cylindrical peripheral shape, a bottom surface of the guiding groove is a plane surface, two side surfaces of the guiding groove are flat surfaces perpendicular to the plane surface, a part of the peripheral surface of the roller is inserted in the guiding groove, and the peripheral surface of the roller is tangent to the plane surface.

Preferably, the bottom surface of the guiding groove is provided with an elongated slot extending along a length direction of the guiding groove.

Preferably, the peripheral surface of the roller is provided with a circle of annular groove, and the annular groove is disposed in the axial middle part of the roller.

Preferably, the width of the guiding groove is greater than the axial length of the roller.

Preferably, an inner cavity of the roller is an inner cylindrical cavity coaxial with the periphery of the roller.

Preferably, one guiding groove is provided, the guiding groove is located on a center line of the roller track, and a part of the periphery of the roller is inserted in the guiding groove.

Preferably, two guiding grooves are provided, the two guiding grooves are symmetrically distributed, and the peripheries of two sides of the roller are respectively inserted in the two guiding grooves.

As described above, the angle-adjustable tripod universal joint of the present disclosure has the following beneficial effects: the inner wall of the roller track is provided with the guiding groove, the bottom surface of the guiding groove is the plane surface, the peripheral surface of the roller is a cylindrical surface, and the peripheral surface of the roller is tangent to the plane surface, which indicates that the roller and the roller track are in linear contact, the contact line is parallel to the axis of the roller, and all contact points on the contact line satisfy the pure rolling condition, thereby reducing the frictional force between the roller and the roller track; and two side surfaces of the guiding groove are flat surfaces perpendicular to the bottom surface, and a part of the peripheral surface of the roller is inserted in the guiding groove, so that the constant fitting of the contour shape of the roller to the guiding groove is ensured, the inclining of the roller in the roller track is eliminated, and the non-loaded side of the roller does not contact the roller track, thereby reducing the slip resistance and axial derived force of the tripod universal joint at the large working angle, also facilitating the reduction of a matching clearance between the roller and the roller track, and reducing a rotating clearance of the tripod universal joint in the circumferential direction caused by the clearance.

REFERENCE NUMERALS OF COMPONENTS

Figure 1:
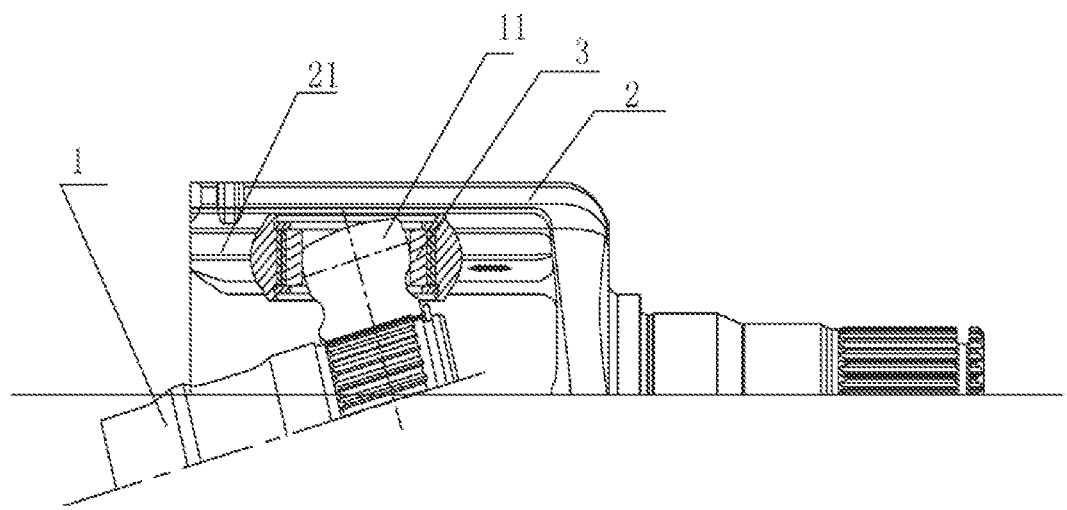
FIG. 1 is a schematic diagram of a tripod universal joint.

1 Tripod
11 Spherical shaft head
2 Universal joint outer part
21 Roller track
200 Contour surface of roller track
201 Guiding groove
202 Elongated slot
203 Bottom surface of guiding groove
204 Side surface of guiding groove
3 Roller
301 Annular groove

DETAILED DESCRIPTION OF THE PREFERRED EMBODIMENTS

Implementations of the present disclosure are described below by using specific embodiments, and a person skilled in the art may easily understand other advantages and efficiency of the present disclosure from the content disclosed in this specification.

It should be noted that the structures, proportions, size, etc. shown in the drawings of the present description are only used to match the contents disclosed in the description for the understanding and reading of those familiar with this technology and are not used to limit the applicable defining conditions of the present disclosure, thereby having no actual technical meaning; and any structural modification, changes in proportion or adjustment in size shall still fall within the scope covered by the description of the present disclosure without affecting the efficiency and achievable objects of the present disclosure. At the same time, the terms such as "upper", "lower", "left", "right", "middle" and "one" quoted in the description are only for clear description, and are not used to limit the implementation scope of the present disclosure. Changes or adjustments in the relative relationship are also considered as the implementation scope of the present disclosure without substantial changes in the technical content.

As shown in FIG. 1, the roller 3 of the tripod universal joint can deflect freely around a spherical shaft head 11 of the tripod 1. When the universal joint is in operation under the condition of an oscillation angle, the roller 3 does not deflect along with the tripod 1 and is always kept symmetrically in contact with the roller track 21 of the universal joint outer part 2, thereby reducing slip friction formed between the roller 3 and the roller track 21, and reducing the slip resistance and axial derived force of the universal joint. Since when the tripod universal joint transmits power, a contact area between the spherical shaft head 11 of the tripod and an inner ring of the roller has a certain length, the reciprocating deflection movement of the tripod 1 relative to the roller 3 may generate a friction torque which causes the roller 3 deflecting, the friction torque makes the roller deflect and no longer symmetrically contact the roller track, so that the frictional force between the roller and the roller track is increased.

Figure 2:
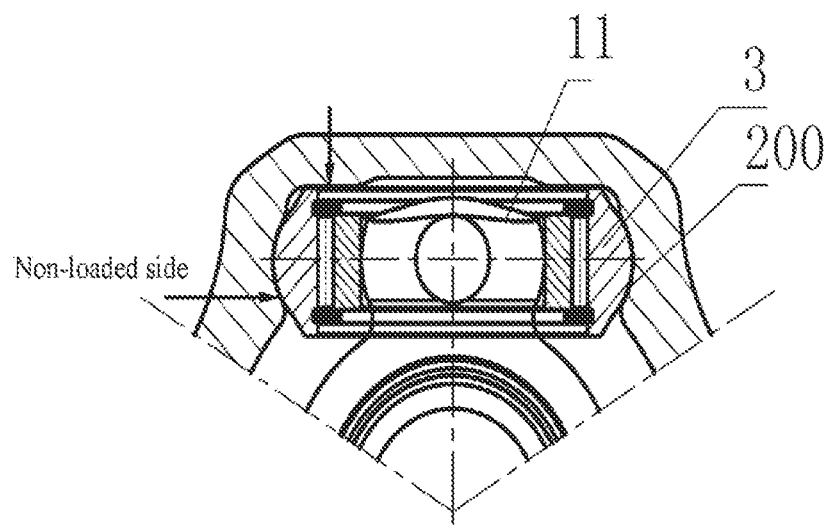
FIG. 2 is a section view of a roller track on the tripod universal joint.

In order to prevent the roller from deflecting under the deflection torque, a method is to design a contour surface 200 of the roller track in a pointed arch shape. As shown in FIG. 2, the peripheral surface of the roller 3 is designed in a ball surface or a circular surface, and the deflection of the roller 3 in the roller track 21 is limited by two separate contact points formed between the pointed-arch roller track and the roller.

However, the above shape of the roller and roller track has the following defects:

1. The roller and the roller track are in an angular contact, i.e., only one contact point on a contact line of the roller with the roller track satisfies the pure rolling condition when the movement speed of the roller relative to the roller track is zero, all remaining contact points have a relative movement speed and have the sliding frictional force, so that the angular-contact contour shape of the roller and roller track may result in a large frictional force between the roller and the roller track.

Figure 3:
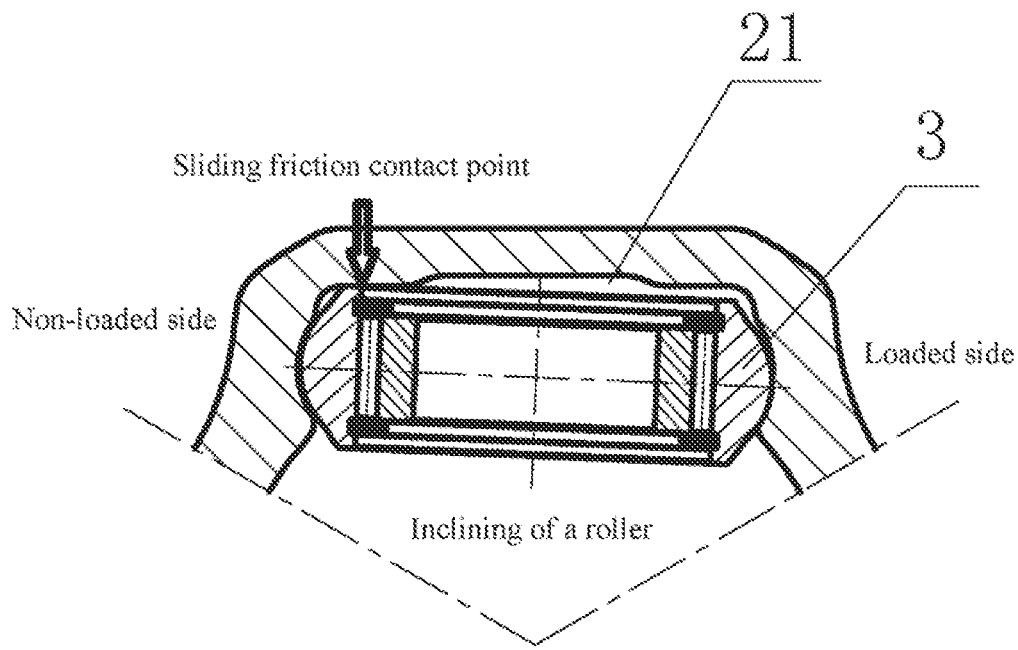
FIG. 3 is a schematic diagram showing the inclining of a roller.

2. When the working angle of the tripod universal joint is large, a ball head of the tripod is no longer directly facing the center of the roller, and the pressure of the ball head for the inner ring of the roller may result in the roller inclining in the roller track, so that as shown in FIG. 3, the non-loaded side of the roller 3 contacts the roller track 21, which causes the universal joint to generate high slip resistance and large axial derived force.

Therefore, a tripod universal joint capable of reducing the slip resistance and axial derived force is required.

Figure 4:
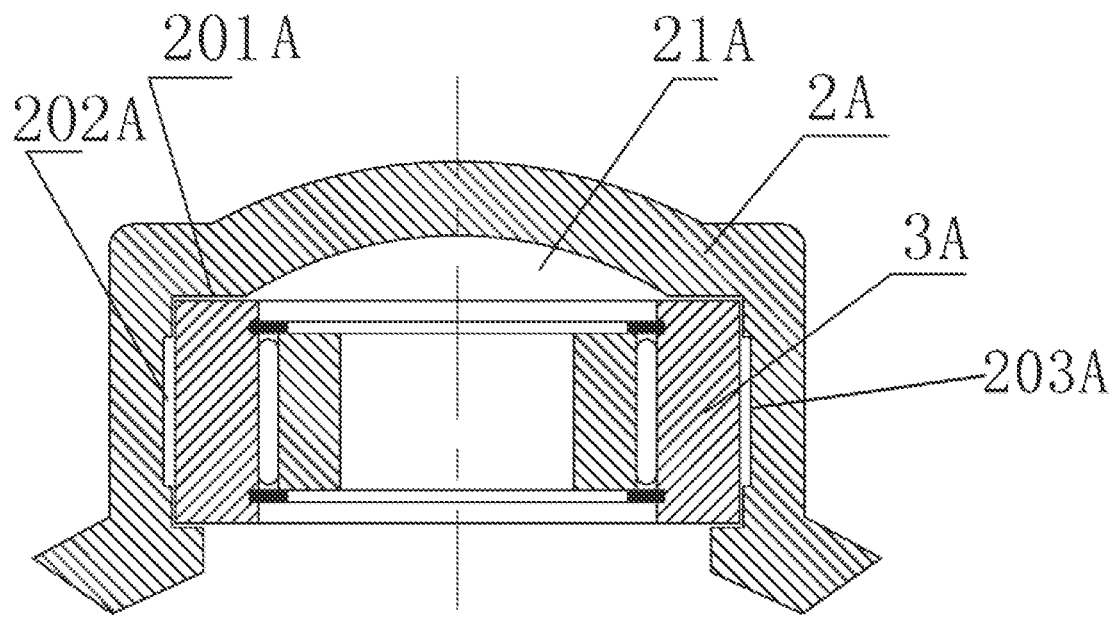
FIG. 4 is a schematic diagram of an embodiment of the tripod universal joint according to the present disclosure.
Figure 5:
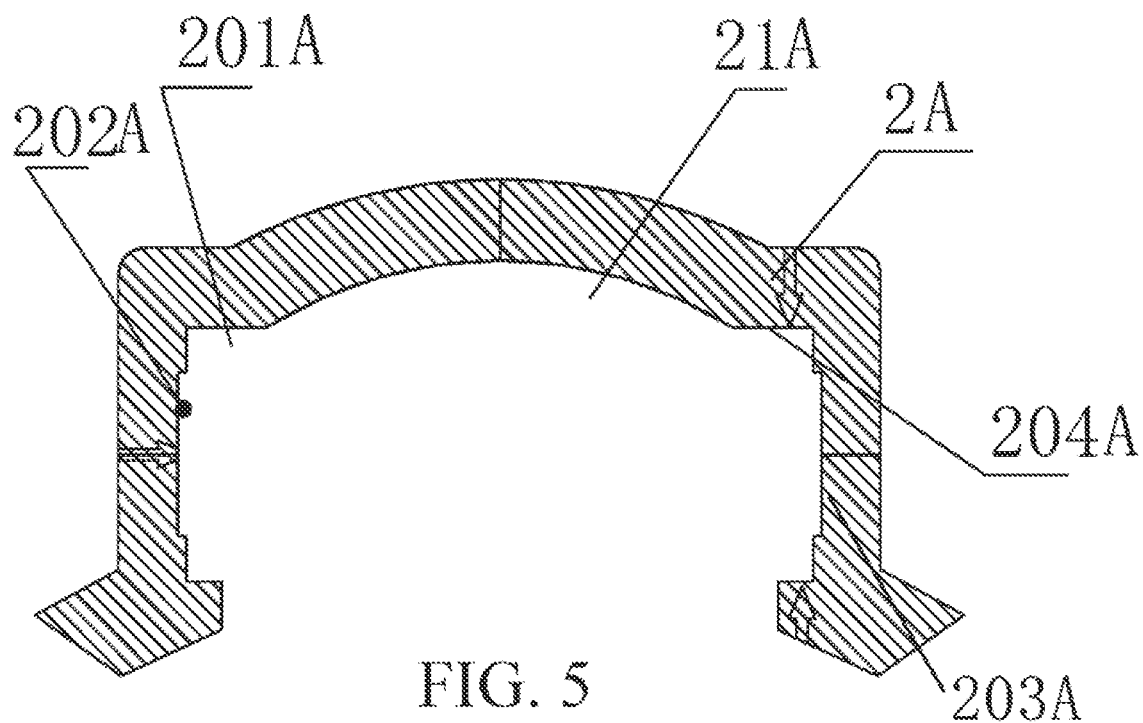
FIG. 5 is an enlarged view of the universal joint outer part in FIG. 4.
Figure 6:
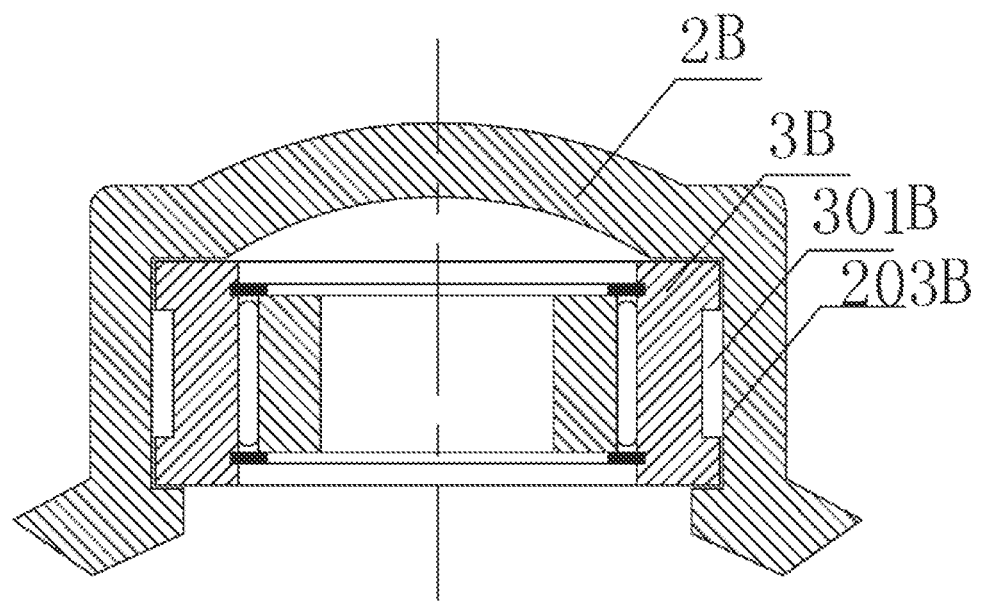
FIG. 6 is a schematic diagram of another embodiment of the tripod universal joint according to the present disclosure.

As shown in FIG. 4, FIG. 5, and FIG. 6, the present disclosure provides an angle-adjustable tripod universal joint. The tripod universal joint comprises a tripod 1, three rollers 3A, 3B and a universal joint outer part 2A, 2B. An inner wall of the universal joint outer part 2A, 2B is provided with a roller track 21A. The roller 3A, 3B is disposed in the roller track 21A and rolls along the roller track 21A. Each spherical shaft head on the tripod is rotatably disposed in an inner cavity of the roller 3A, 3B. The inner wall of the roller track 21A is provided with three guiding grooves 201A. The roller 3A, 3B has a cylindrical peripheral shape. As shown in FIG. 5 and FIG. 6, a bottom surface 203A 203B of the guiding groove is a plane surface, two side surfaces (side surfaces 204A of the guiding groove) of the guiding groove are flat surfaces perpendicular to the plane surface. A part of the peripheral surface of the roller 3A, 3B is inserted in the guiding groove 201A, and the peripheral surface of the roller is tangent to the plane surface.

The inner wall of the roller track is provided with the guiding groove 201A, the bottom surface 203A, 203B of the guiding groove is the plane surface, the peripheral surface of the roller 3A, 3B is a cylindrical surface. The peripheral surface of the roller is tangent to the plane surface, which indicates that the roller 3A, 3B and the roller track 21A are in linear contact, the contact line is parallel to the axis of the roller 3A, 3B, and all contact points on the contact line satisfy the pure rolling condition, thereby reducing the frictional force between the roller 3A, 3B and the roller track 21A. The side surfaces 204A of the guiding groove are plane surfaces perpendicular to the bottom surface 203A, 203B of the guiding groove, and a part of the peripheral surface of the roller 3A, 3B is inserted in the guiding groove 201A, so that the contour shape of the roller 3A, 3B is fitted to the guiding groove 201A constantly, which eliminates the inclining of the roller 3A, 3B in the roller track 21A, ensures that the non-loaded side of the roller does not contact the roller track. Therefore, the slip resistance and axial derived force of the tripod universal joint at the large working angle are reduced, the reduction of a matching clearance between the roller and the roller track is facilitated, and the rotating clearance of the tripod universal joint in the circumferential direction caused by the clearance is reduced.

In order to prevent the roller from deflecting in the roller track, an embodiment is disclosed, as shown in FIG. 4 and FIG. 5. The bottom surface of the guiding groove 201A is provided with an elongated slot 202A extending along a length direction of the guiding groove. The contact line between the roller 3A and the roller track 21A is divided into two separate straight lines because of the guiding groove 201A. As shown in FIG. 4, the frictional force formed in the two sections of contact line can form a frictional resistance torque, and the frictional resistance torque can counteract a deflection torque generated by a spherical head shaft of the tripod acting on the surface of the inner cavity of the roller, so that the roller 3A is not easy to deflect in the roller track 21A, and the axis of the roller is always kept parallel to the center line of the roller track. Moreover, the distance between the two sections of contact line can be increased by increasing an axial length of the roller, i.e., increasing the width of the elongated slot, thereby increasing the friction torque, and preventing the deflection of the roller. The elongated slot 202A in the present embodiment can be formed by sinking the bottom wall of the guiding groove 201A.

In order to form the contact line between the roller 3A and the roller track 21A into two separate straight lines, the present disclosure provides another embodiment. As shown in FIG. 6, the peripheral surface of the roller in the present embodiment is provided with a circular groove 301B, and the annular groove 301B is located in the axial middle part of the roller 3A. The peripheral surface of the roller is provided with the annular groove, and the roller 3A does not contact the bottom surface 203B of the guiding groove, so that the contact line of the roller 3A and the roller track 21A is formed by two separate straight lines.

In order to realize a larger working angle, the width of the guiding groove 201A is greater than the axial length of the roller 3A. That is to say, two ends of the roller 3A are in clearance fit with two side surfaces of the guiding groove 201A.

In order to better match with the spherical head shaft of the tripod, the inner cavity of the roller 3A is an inner cylindrical cavity coaxial with the periphery of the roller 3A.

In order to facilitate the implementation, only one guiding groove is provided, the guiding groove is located on a center line of the roller, and a part of the periphery of the roller is inserted in the guiding groove.

Alternatively, the number of guiding grooves 201A is two, and the two guiding grooves are symmetrically distributed. As shown in FIG. 4 and FIG. 6, the peripheries of two sides of the roller 3A are respectively inserted in the two guiding grooves 201A, thereby better preventing the roller 3A from deflecting in the roller track 21A.

In conclusion, in the angle-adjustable tripod universal joint of the present disclosure, both the side surfaces and bottom surface of the guiding groove are flat surfaces, and the roller is a cylindrical roller, thereby facilitating the manufacturing. The inner wall of the roller is provided with the guiding groove, the bottom surface of the guiding groove is plane surface, the peripheral surface of the roller is a cylindrical surface, the peripheral surface of the roller is tangent to the plane surface, which indicates that the roller and the roller track are in linear contact, the contact line is parallel to the axis of the roller, and all contact points on the contact line satisfy the pure rolling condition, thereby reducing the frictional force between the roller and the roller track. Therefore, the present disclosure effectively overcomes the defects in the prior art and has high industrial utilization value.

The foregoing embodiments are merely for exemplarily describing the principle and the functions of the present disclosure rather than limiting the present disclosure. Any person skilled in the art can make variations or modifications to the foregoing embodiments without departing from the spirit and scope of the present disclosure. All equivalent variations or modifications made by a person of ordinary skill in the art without departing from the spirit and technical idea of the present disclosure still should be covered by the claims of the present disclosure.

What is claimed is:

1. An angle-adjustable tripod universal joint, comprising:
   a tripod;
   three rollers; and
   a universal joint outer part, wherein
      an inner wall of the universal joint outer part is provided with three roller tracks;
   wherein for each roller,
      the roller is disposed in a corresponding roller track and rolls along the corresponding roller track,
      a spherical shaft head on the tripod is rotatably disposed in an inner cavity of the roller,
      an inner wall of the roller track is provided with at least one guiding groove,
      the roller has a cylindrical peripheral shape,
      a bottom surface of the guiding groove is a plane surface,
      two side surfaces of the guiding groove are flat surfaces perpendicular to the plane surface, wherein two ends of the roller are in clearance fit with the two side surfaces of the guiding groove,
      the bottom surface of the guiding groove is provided with an elongated slot extending along the length direction of the guiding groove,
      a part of the peripheral surface of the roller is inserted in the guiding groove, and
      the peripheral surface of the roller is tangent to the plane surface so that the plane surface of the roller track and the roller are in linear contact and have a contact line consisting of two unconnected line segments separated by the elongated slot,
         wherein the roller track and the roller generate a frictional resistance torque by frictional forces on the two unconnected line segments, and the frictional resistance torque is configured to counteract a deflection torque generated by the spherical head shaft of the tripod acting on a surface of the inner cavity of the roller.

2. The angle-adjustable tripod universal joint as in claim 1, wherein the width of the guiding groove is greater than the axial length of the roller.

3. The angle-adjustable tripod universal joint as in claim 1, wherein the inner cavity of the roller is an inner cylindrical cavity coaxial with the periphery of the roller.

4. The angle-adjustable tripod universal joint as in claim 1, wherein two guiding grooves are provided for each roller track, the two guiding grooves are symmetrically distributed, and the peripheries of two sides of the corresponding roller are respectively inserted in the two guiding grooves.

* * * * *